United States Patent
Ben Yahia et al.

(10) Patent No.: US 12,499,676 B2
(45) Date of Patent: Dec. 16, 2025

(54) RECURRENT NEURAL NETWORKS FOR HIGH RESOLUTION IMAGE AND VIDEO PROCESSING

(71) Applicant: QUALCOMM Incorporated, San Diego, CA (US)

(72) Inventors: Haitam Ben Yahia, Diemen (NL); Amirhossein Habibian, Amsterdam (NL); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 18/159,587

(22) Filed: Jan. 25, 2023

(65) Prior Publication Data

US 2024/0249512 A1     Jul. 25, 2024

(51) Int. Cl.
*G06V 10/82*     (2022.01)
*G06T 5/20*     (2006.01)

(52) U.S. Cl.
CPC ............... *G06V 10/82* (2022.01); *G06T 5/20* (2013.01); *G06T 2207/20081* (2013.01)

(58) Field of Classification Search
CPC . G06V 10/82; G06T 5/20; G06T 2207/20081; G06N 3/0455; G06N 3/0464; G06N 3/08; G06N 3/0442
See application file for complete search history.

(56) References Cited

U.S. PATENT DOCUMENTS 12,149,716 B2 * 11/2024 Brongers ............. G06V 10/776
12,206,851 B2 * 1/2025 Zhang .................... G06N 3/084
2017/0262995 A1 * 9/2017 Li ........................... G06N 3/044
2020/0304822 A1 * 9/2020 Wang ..................... G06V 20/41
2021/0103816 A1 * 4/2021 Bradbury ............... G06N 3/045
2021/0150727 A1 * 5/2021 Park ........................ G06N 3/04
2022/0189171 A1 * 6/2022 Fan ........................ G06V 10/82
2022/0381914 A1 * 12/2022 Cheng .................... G06V 20/64

(Continued)

OTHER PUBLICATIONS

Liang, Lianhui, Shaoquan Zhang, and Jun Li. "Multiscale DenseNet meets with bi-RNN for hyperspectral image classification." IEEE Journal of Selected Topics in Applied Earth Observations and Remote Sensing 15 (2022): 5401-5415. (Year: 2022).*

(Continued)

*Primary Examiner* — Andrae S Allison
(74) *Attorney, Agent, or Firm* — QUALCOMM Incorporated; Espartaco Diaz Hidalgo

(57) ABSTRACT

Disclosed are systems, apparatuses, processes, and computer-readable media for processing image data. For example, a process can include processing, for a first time step of a recurrent machine learning network, a first image of a plurality of images using a first subset of a group of distributed recurrent parameters to generate a first hidden state output associated with the first image. A process can include providing the first hidden state output as a recurrent state input to a second time step of the recurrent machine learning network. A process can include processing, for the second time step of the recurrent machine learning network, a second image of the plurality of images using the recurrent state input and a second subset of the group of distributed recurrent parameters to generate a second hidden state output associated with the second image.

30 Claims, 8 Drawing Sheets

(56) References Cited

U.S. PATENT DOCUMENTS

| | | | |
|---|---|---|---|
| 2023/0046248 A1* | 2/2023 | Veyseh | G06N 3/09 |
| 2023/0260304 A1* | 8/2023 | Wang | G06V 30/18057 |
| | | | 382/100 |
| 2023/0308666 A1* | 9/2023 | Brongers | G06V 10/82 |
| 2024/0249512 A1* | 7/2024 | Ben Yahia | G06N 3/08 |

OTHER PUBLICATIONS

Pavel, Mircea Serban, Hannes Schulz, and Sven Behnke. "Recurrent convolutional neural networks for object-class segmentation of RGB-D video." 2015 International Joint Conference on Neural Networks (IJCNN). IEEE, 2015. (Year: 2015).*

Ghodrati A., et al., "Video Time: Properties, Encoders and Evaluation", Arxiv.Org, Cornell University Library, 201 Olin Library Cornell University Ithaca, NY 14853, arXiv:1807.06980v1 [cs.CV], Jul. 18, 2018, XP081113901, pp. 1-14, the whole document.

International Search Report and Written Opinion—PCT/US2024/011860—ISA/EPO—May 7, 2024.

* cited by examiner

RECURRENT NEURAL NETWORKS FOR HIGH RESOLUTION IMAGE AND VIDEO PROCESSING

FIELD

The present disclosure generally relates to image processing. For example, aspects of the present disclosure are related to systems and techniques for performing image processing using one or more machine learning systems based on recurrent architectures.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing image processing using one or more recurrent machine learning networks. According to at least one illustrative example, an apparatus for processing at least a first image and a second image of a plurality of images is provided. The apparatus includes at least one memory configured to store at least the first image and the second image and at least one processor coupled to the at least one memory and configured to: process, for a first time step of a recurrent machine learning network, a first image of the plurality of images using a first subset of a group of distributed recurrent parameters to generate a first hidden state output associated with the first image; provide the first hidden state output as a recurrent state input to a second time step of the recurrent machine learning network; and process, for the second time step of the recurrent machine learning network, a second image of the plurality of images using the recurrent state input and a second subset of the group of distributed recurrent parameters to generate a second hidden state output associated with the second image.

In another example, a method for processing at least a first image and a second image of a plurality of images is provided, the method comprising: processing, for a first time step of a recurrent machine learning network, a first image of the plurality of images using a first subset of a group of distributed recurrent parameters to generate a first hidden state output associated with the first image; providing the first hidden state output as a recurrent state input to a second time step of the recurrent machine learning network; and processing, for the second time step of the recurrent machine learning network, a second image of the plurality of images using the recurrent state input and a second subset of the group of distributed recurrent parameters to generate a second hidden state output associated with the second image.

In another example, a system for processing at least a first image and a second image of a plurality of images is provided, the system comprising at least one memory configured to store at least the first image and the second image and at least one processor coupled to the at least one memory, the at least one processor configured to: process, for a first time step of a recurrent machine learning network, a first image of the plurality of images using a first subset of a group of distributed recurrent parameters to generate a first hidden state output associated with the first image; provide the first hidden state output as a recurrent state input to a second time step of the recurrent machine learning network; and process, for the second time step of the recurrent machine learning network, a second image of the plurality of images using the recurrent state input and a second subset of the group of distributed recurrent parameters to generate a second hidden state output associated with the second image.

In another example, a non-transitory computer-readable medium is provided that includes instructions that, when executed by at least one processor, cause the at least one processor to: process, for a first time step of a recurrent machine learning network, a first image of a plurality of images using a first subset of a group of distributed recurrent parameters to generate a first hidden state output associated with the first image; provide the first hidden state output as a recurrent state input to a second time step of the recurrent machine learning network; and process, for the second time step of the recurrent machine learning network, a second image of the plurality of images using the recurrent state input and a second subset of the group of distributed recurrent parameters to generate a second hidden state output associated with the second image.

In another example, an apparatus for processing at least a first image and a second image of a plurality of images is provided. The apparatus includes: means for processing, for a first time step of a recurrent machine learning network, a first image of the plurality of images using a first subset of a group of distributed recurrent parameters to generate a first hidden state output associated with the first image; means for providing the first hidden state output as a recurrent state input to a second time step of the recurrent machine learning network; and means for processing, for the second time step of the recurrent machine learning network, a second image of the plurality of images using the recurrent state input and a second subset of the group of distributed recurrent parameters to generate a second hidden state output associated with the second image.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
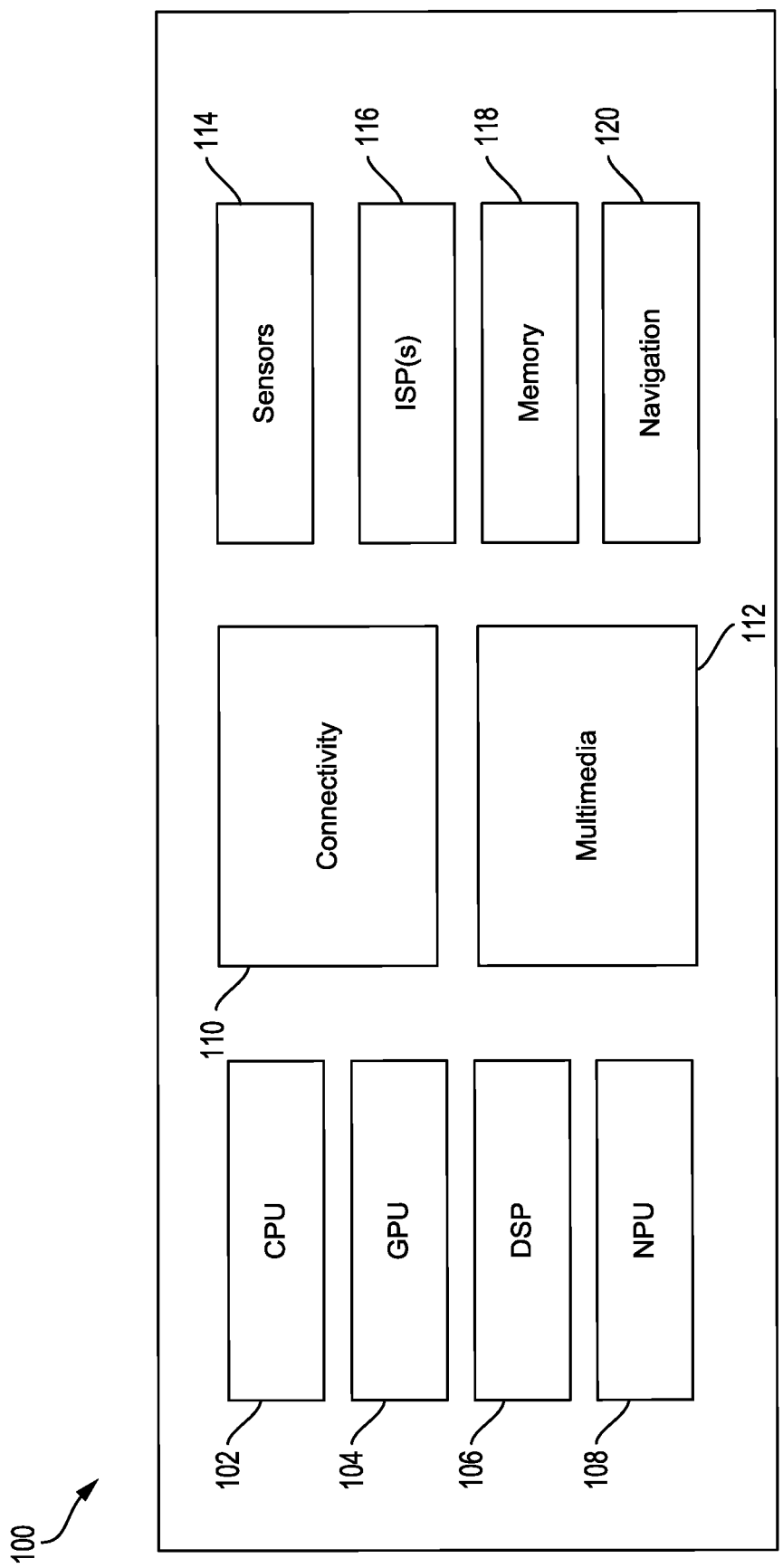
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

The demand and consumption of image and video data has significantly increased in consumer and professional settings. As previously noted, devices and systems are commonly equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured and processed and output (and/or stored) for consumption. The image and/or video can be further processed for certain effects, such as compression, frame rate up-conversion, sharpening, color space conversion, image enhancement, high dynamic range (HDR), de-noising, low-light compensation, among others. The image and/or video can also be further processed for certain applications such as computer vision, extended reality (e.g., augmented reality, virtual reality, and the like), image recognition (e.g., face recognition, object recognition, scene recognition, etc.), and autonomous driving, among others. In some examples, the image and/or video can be processed using one or more image or video artificial intelligence (AI) models, which can include, but are not limited to, AI quality enhancement and AI augmentation models.

Image and video processing operations can be computationally intensive. In some cases, image and video processing operations can become increasingly computationally intensive as the resolution of the input image or frame of video data increases (e.g., as the number of pixels to be processed per input image or frame of video data increases). For example, a frame of video data with a 4K resolution can include approximately four times as many individual pixels as a frame of video data with a full HD (e.g., 1080p) resolution. In some examples, image and video processing operations can be performed by processing each pixel individually. In some examples, image and video processing operations can be performed using one or more machine learning models to derive a mapping from input image data (e.g., raw image data captured by one or more image sensors) to a final output image. As used herein, the terms "image processing" and "video processing" may be used interchangeably, such as in describing an image processing neural network and a video processing neural network (e.g., based on video data comprising a series of frames (e.g., images) that may be processed consecutively).

For example, one or more machine learning models can be used to derive a mapping between raw image data that includes a color value for each pixel location and a final output image. The final output image can include processed image data derived from the raw image data (e.g., based on the mapping learned by the one or more machine learning models). In some examples, one or more machine learning models can be implemented in an image signal processor (ISP) of a smartphone, camera, or other computing device, and used to process captured frames of video data. For example, one or more machine learning models can be used to perform processing operations for captured frames of video data, such as denoising, deblurring, high dynamic range (HDR) imaging, upscaling (e.g., super resolution), compression, etc. In another example, one or more machine learning models can additionally, or alternatively, be used to perform processing operations such as depth-estimation, semantic segmentation, human pose estimation, etc., using the captured frames of video data as input.

In some examples, the one or more machine learning models can include a neural network trained to perform the image and/or video processing task(s). For example, the neural network can be implemented using a convolutional neural network (CNN) architecture including one or more convolutional filters, and/or can be implemented using a recurrent neural network (RNN) architecture using one or more recurrent connections and recurrent states. An image processing neural network can include an input layer, multiple hidden layers, and an output layer. The input layer can include the raw image data from one or more image sensors. The hidden layers can include convolutional filters that can be applied to the input data, or to the outputs from previous hidden layers to generate feature maps. The filters of the hidden layers can include weights used to indicate an importance of the nodes of the filters. In some cases, the neural network can have a series of many hidden layers, with early layers determining simple and low-level characteristics of the raw image input data, and later layers building up a hierarchy of more complex and abstract characteristics. The neural network can then generate the final output image (e.g., making up the output layer) based on the determined high-level features.

Machine learning networks that receive as input a first image data (e.g., raw image data) and generate as output a second image data (e.g., a final processed image) can be referred to as image-to-image translation networks, or image2image networks. As mentioned previously, image or video processing operations performed using a machine learning (e.g., image2image) network can increase in computational complexity as the number of pixels per input image or video frame increases. In some cases, image or video processing operations performed using a machine learning (e.g., image2image) network can increase in computational complexity as the number of hidden layers increases, as the number of nodes or activation functions increases, and/or as the number of connections between nodes or layers increases. For example, a node (e.g., neuron) in a neural network can apply an activation function to a group of weighted inputs, and return an output generated by the activation function. An increase in the number of hidden layers or nodes can cause an increase in the computational complexity of an image processing machine learning (e.g., image2image) network, based on a greater number of mathematical operations being performed for each image that is processed.

An increase in the number of hidden layers or nodes can also cause an increase in the size of an image processing machine learning (e.g., image2image) network. For example, the activation functions and weights associated with a neural network can each be associated with one or more numerical values (e.g., numerical values used to apply the activation function or weight). As the number of hidden layers or nodes of a machine learning network increases, the number (e.g., quantity) of numerical values that are stored and applied in association with the machine learning network also increases.

As mentioned previously, the operations implemented to perform image and/or video processing operations can be computationally intensive and can place a significant burden on the hardware resources of a device. For example, the computational complexity of image and video processing operations performing using a machine learning network (e.g., neural network) can increase as the resolution of each frame of video data (e.g., image) increases. For instance, a frame of 4K video data includes approximately four times as many individual pixels as a frame of full HD video data, and computational complexity of a video processing operation may increase based on being performed for an increased quantity of pixels. In some cases, the size and complexity of a machine learning network used to perform image and video processing operations may also increase as the framerate of an input video image data increases. For example, each frame of video data included in a 4K 60 fps video must be processed in half the time available for processing a 4K 30 fps frame, when real-time video processing operations are desired (e.g., 1/60 s vs. 1/30 s).

In some examples, one or more image processing machine learning models (e.g., neural networks) can be implemented by a smartphone, mobile computing device, or other edge computing device that includes or is otherwise associated with a camera or other image capture device. In some cases, smartphones or other edge computing devices implementing image processing machine learning models can be limited by a combination of the device's available computation resources and the device's power supply and/or consumption limits. Smartphones or other edge computing devices implementing image processing machine learning models may additionally, or alternatively, be limited based on a maximum permissible inference time (e.g., the amount of time for the machine learning model to generate a processed image output based on a given input of raw image data). For example, to perform real-time augmentation or enhancement operations on video data, in some cases an image processing machine learning model may have a latency target of approximately 20 milliseconds (ms) or less per frame of video data.

In some examples, smartphones and other edge computing devices associated with limited computational resources and power can implement image processing machine learning models by using a model with a reduced size. For example, the size of an image processing machine learning model can be reduced by decreasing the total number of hidden layers, nodes, activation functions, weights, etc., that are applied by the machine learning model in generating a processed output image based on a raw image data input. In some cases, a reduction in model size can impact the accuracy of the processed output image that is generated by the image processing machine learning model.

In some examples, the size and/or computational complexity of an image or video processing machine learning model (e.g., neural network) can be reduced based on reducing the quantity of recurrent connections and/or removing recurrent connections, such that the hidden state(s) and output(s) associated with a given time step do not depend on the those determined in previous time steps. Reducing or eliminating recurrent connections can be associated with a reduced accuracy of the processed output images that are generated by the machine learning model. For example, reducing or eliminating recurrent connections can impact the ability of the machine learning model to utilize temporal information in generating the processed output images (e.g., the use of recurrent connections and temporal information can be associated with greater visual quality of the processed output images).

For instance, the use of recurrent connections and/or temporal information in a video processing machine learning model can be used to recover high-frequency details across adjacent (e.g., in time) frames of video data, to achieve temporal consistency in a processed output video generated by the video processing machine learning network, etc. Various recurrent architectures (e.g., RNNs) that include one or more recurrent cells among the feed-forward layers of the network can be used to perform video processing operations to generate processed output videos having a relatively high visual quality. For example, recurrent cells can be implemented using a vanilla-RNN architecture, a Conv-GRU (Gated Recurrent Unit) architecture, a Conv-LSTM (Long Short-Term Memory) architectures, among various others.

There is a need for systems and techniques that can accelerate video (e.g., image) processing operations performed using recurrent architectures. For example, there is a need to accelerate video processing operations performed using RNNs. There is also a need for systems and techniques that can be used to improve the efficiency of video processing operations performed using RNNs, including video processing operations utilizing high-resolution (e.g., 4K, 6K, 8K, etc.) and/or high frame rate (e.g., 60 fps, 120 fps, etc.) inputs of video data.

Systems, apparatuses, processes (also referred to as methods), and computer-readable media (collectively referred to as "systems and techniques") are described herein for processing images (e.g., image data or video data) using recurrent machine learning networks. For example, a recurrent machine learning network (e.g., RNN) can be trained using an increased quantity of recurrent parameters and used to perform inference using different subsets of the learned recurrent parameters for different time steps. For instance, a group of recurrent parameters can be learned jointly (e.g., during training), and inference can be performed based on using different ones of the group of jointly learned recurrent parameters for different time steps of the inference operation. In one illustrative example, the systems and techniques can be used to process images (e.g., image data or video data) based on distributing recurrent parameters across inference time steps.

In another example, the systems and techniques can be used to process images (e.g., image data or video data) based on compressing at least a portion of the recurrent states utilized by a recurrent machine learning network (e.g., RNN). For instance, the systems and techniques can utilize one or more efficient convolutions to reduce the dimensions of state tensors associated with the recurrent states of an RNN. In some examples, the systems and techniques can include an encoder trained to compress (e.g., encode) the recurrent state (e.g., hidden state) output of the RNN at each time step t, with the compressed recurrent state representation provided as the recurrent input to the RNN hidden layers in the subsequent time step t+1. A corresponding decoder can be trained to decompress (e.g., decode) a compressed recurrent state representation received as input, in order to recover the recurrent state output of the RNN at the previous time step.

In another example, the systems and techniques can be used to process images (e.g., image data or video data) based on a simplified recurrent cell architecture. For instance, a recurrent machine learning network (e.g., RNN) can include one or more clipped activation functions to clip one or more values within a pre-determined range. In one illustrative example, tanh and/or sigmoid functions can be replaced with one or more clipping functions (e.g., such as clipping between [−1,1] and [0,1], respectively). In some cases, one or more internal paths can be removed from a recurrent cell architecture to improve an inference speed and/or efficiency of the corresponding RNN.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Figure 3:
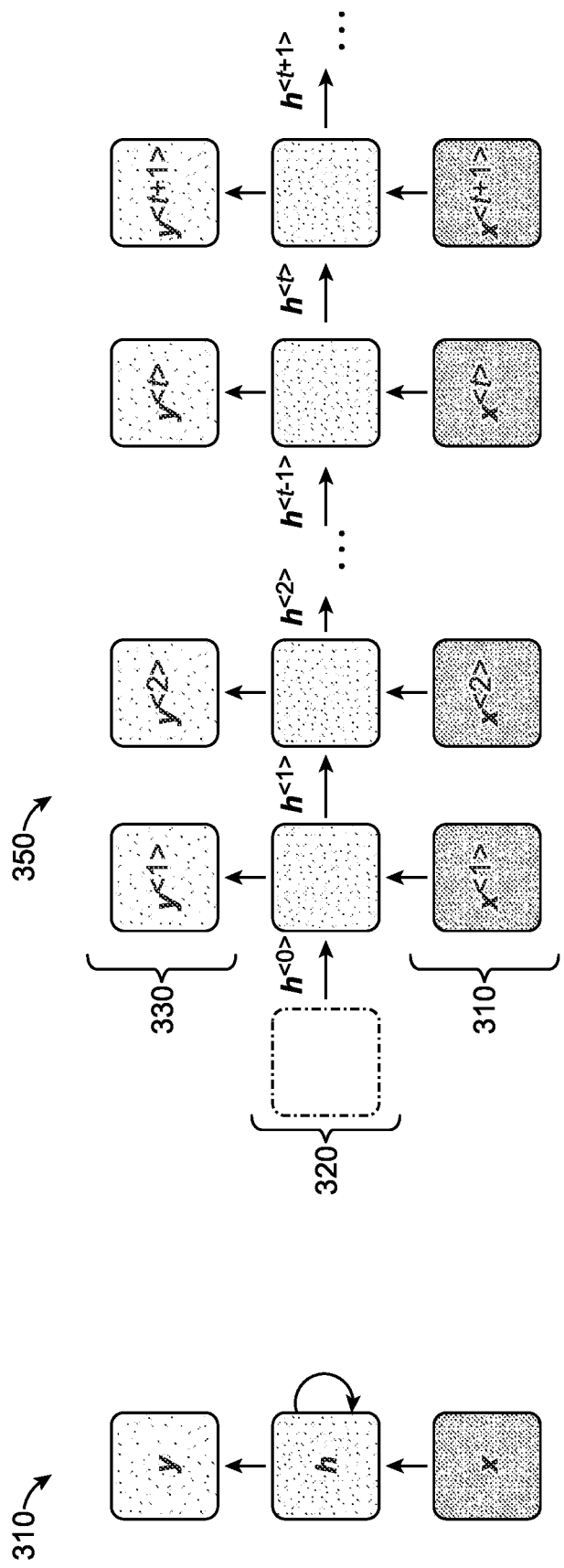
FIG. 3 illustrates an example of a recurrent neural network architecture, in accordance with some examples.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence (for instance, an example of a recurrent neural network architecture is depicted in FIG. 3, described in greater depth below). A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
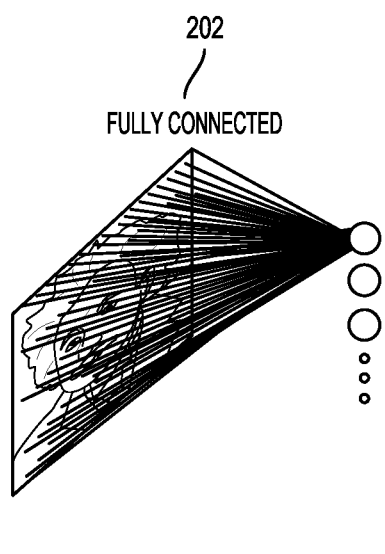
FIG. 2A illustrates an example of a fully connected neural network, in accordance with some examples.
Figure 2B:
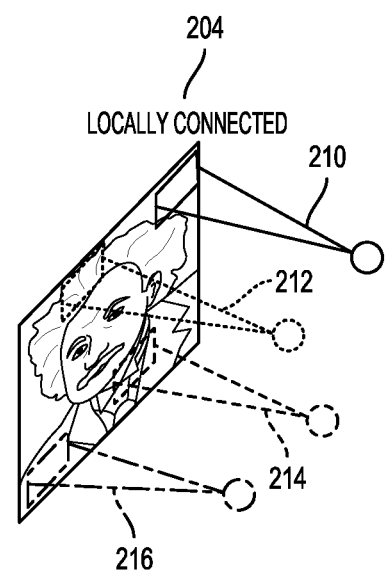
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As noted previously, a recurrent neural network (RNN) can include one or more recurrent connections in which the output from a neuron in a given layer may be communicated to another neuron in the same layer. For example, FIG. 3 is a diagram illustrating an example of a recurrent neural network architecture. The RNN architecture 310 includes an input x, which can also be represented as x(t) (e.g., the input to the RNN at time step t). One or more hidden layers can generate or otherwise be associated with a hidden state h, which can also be represented as h(t) (e.g., the hidden state of the RNN at time step t). An output y can be generated based on one or more of the hidden states h. For example, in a one-to-one RNN architecture, an output y(t) can be generated for each time step t. In another example, in a many-to-one RNN architecture, an output y(t) can be generated over multiple time steps t (e.g., the inputs x and hidden states h of multiple previous time steps can be used to determine the many-to-one output y(t) at time step t).

The hidden state h(t) of the RNN architecture 310 represents a hidden state of the RNN at the time step t and can be calculated based on the current input x(t) and the previous time step's hidden state. For example, the hidden state h(t) associated with the hidden layers h of the RNN 310 at time t can be used to generate a corresponding output y(t) for the time step t and may also be provided as a recurrent input to the same hidden layers h for the next time step t+1. For example, the hidden state h(t) of RNN 310 can be determined based on x(t) and h(t−1).

The RNN architecture 350 is an unrolled (e.g., also referred to as unfolded) representation of the RNN architecture 310, depicting the inputs and outputs of the various layers of the RNN over multiple time steps. As illustrated, the RNN 350 includes a plurality of recurrent connections between the hidden layers 320 associated with the multiple time steps. For example, at time step 1, an input layer 310 can be associated with the input $x^{<1>}$, which is provided as input to the hidden layer 320. At time step 1, the hidden layer 320 may also receive as input the hidden state $h^{<0>}$ that was generated in the previous time step 0. Based on the current input $x^{<1>}$ and the previous hidden state $h^{<0>}$, the hidden layer 320 can generate the current hidden state $h^{<1>}$ for time step 1.

The hidden state $h^{<1>}$ can be output by the hidden layers 320 and received as input to one or more output layers 330, which generate or are otherwise associated with an output $y^{<1>}$ that is determined for the current time step 1.

The hidden state $h^{<1>}$ output by the hidden layers 320 at time step 1 is also provided as an input to the next time step 2, for example using a recurrent connection between the hidden layers 320 at time step 1 and the hidden layers 320 at time step 2. At time step 2, the hidden layers 320 can generate a new or updated hidden state $h^{<2>}$, based on the input $x^{<2>}$ and the previous hidden state output $h^{<1>}$. In some examples, the hidden state outputs that are provided as hidden state inputs to subsequent time steps may also be referred to as "recurrent states" of the RNN (e.g., at time step 2, the hidden layers 320 can generate the new or updated hidden state $h^{<2>}$, using the input $x^{<2>}$ and the recurrent state $h^{<1>}$). One or more learned coefficients and/or parameters can be shared temporally by the various layers of the RNN architecture 350. For example, some (or all) of the input layers 310, the hidden layers 320, and the output layers 330, etc., can use the same, shared coefficients and/or parameters at each time step.

As noted previously, there is a need for systems and techniques that can accelerate video (e.g., image) processing operations performed using recurrent architectures. For example, there is a need to accelerate video processing operations performed using RNNs. There is also a need for systems and techniques that can be used to improve the efficiency of video processing operations performed using RNNs, including video processing operations utilizing high-resolution (e.g., 4K, 6K, 8K, etc.) and/or high frame rate (e.g., 60 fps, 120 fps, etc.) inputs of video data.

Figure 4:
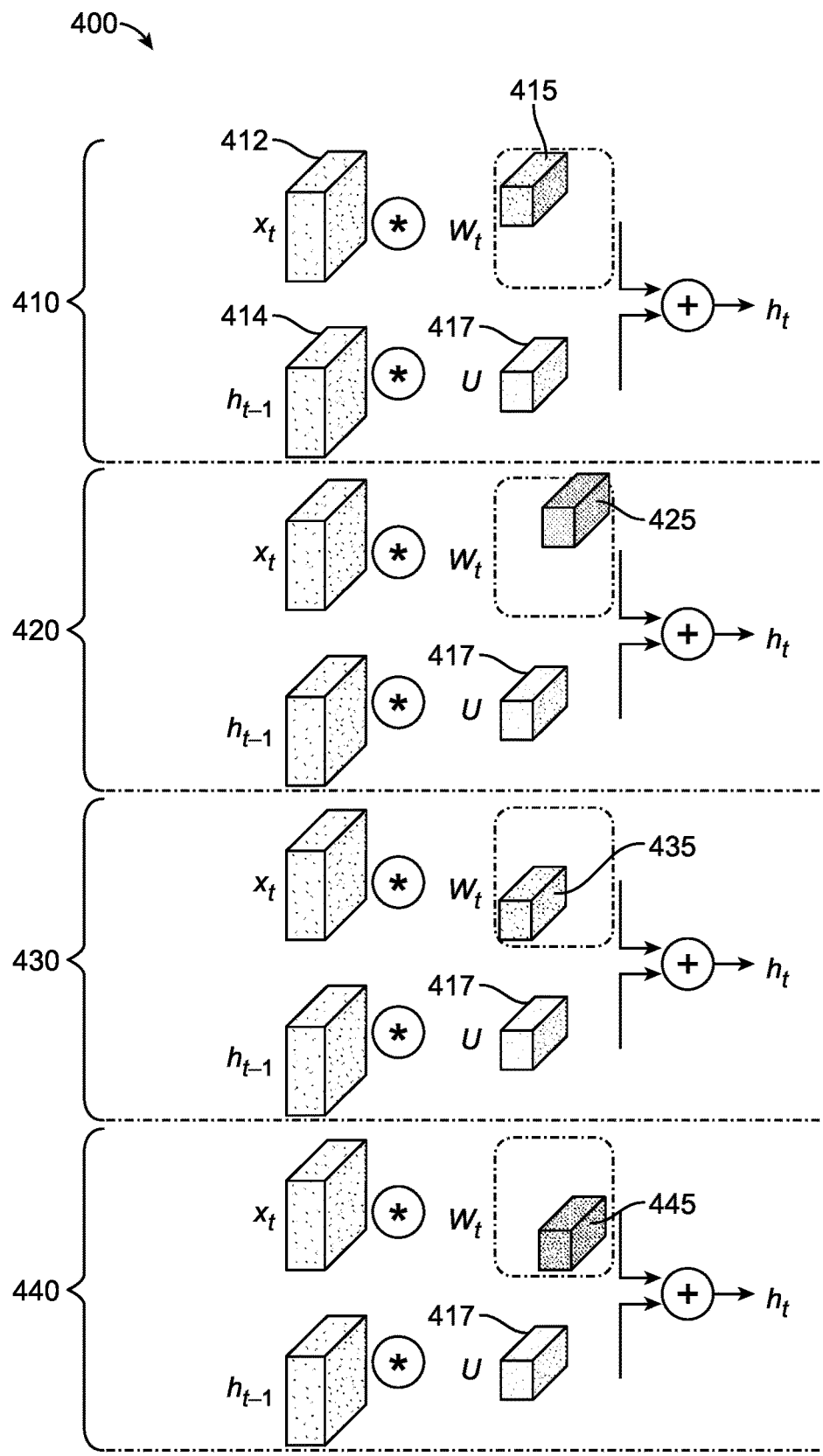
FIG. 4 illustrates an example of a recurrent neural network architecture using distributed recurrent parameters, in accordance with some examples.

FIG. 4 is a diagram illustrating an example of a recurrent neural network architecture 400 using distributed recurrent parameters, in accordance with some examples. As will be described in greater depth below, the recurrent neural network 400 can be used to process image data (e.g., image data or video data) based on using distributed recurrent parameters, with different recurrent parameters distributed (e.g., utilized) in different time steps. In existing neural network approaches to processing image data or video data, the quantity of recurrent parameters that are utilized may be limited based on the input size of an input image $x_t$ (e.g., input image data or input video data). For instance, existing neural network approaches may use a limited quantity of recurrent parameters based on the quantity of pixels included in the input image $x_t$, which may be a full HD (FHD) frame, a 4K or ultra-HD (UHD) frame, etc. Based on factors such as available inference time (e.g., when performing real-time image processing), available computational resources, etc., existing neural network approaches to image processing may utilize thin models with a relatively small quantity of recurrent parameters.

In one illustrative example, the systems and techniques described herein can utilize an increased quantity of recurrent parameters to process an input image $x_t$, based on learning a group of recurrent parameters jointly and using a subset of the jointly learned recurrent parameters in each inference time step. By utilizing the subset(s) of the jointly learned recurrent parameters during each inference time step, the systems and techniques can utilize a fixed compute budget (e.g., compute resources) to generate processed output image data with a greater accuracy and/or level of detail, as will be described in greater depth below.

The recurrent neural network 400 can be used to process image data (e.g., image data or video data) that is provided as an input $x_t$ to one or more input layers 412. In one illustrative example, the recurrent neural network 400 can be provided as an RNN. The one or more input layers 412 can receive a respective input $x_t$ of image data (e.g., a frame of video data, an image, etc.) in a plurality of different time steps 410, 420, 430, 440. In each time step, the respective input $x_t$ of image data can be processed using one or more sets of recurrent parameters. The set of recurrent parameters used at each time step can be selected from (e.g., can be a subset of) a larger group of jointly learned recurrent parameters, as noted above. For example, the recurrent neural network 400 can utilize a group of four jointly learned recurrent parameters 415, 425, 435, 445, with one of the four jointly learned recurrent parameters being used to process the input image data $x_t$ in each time step t.

For example, in a first time step 410, RNN 400 can obtain or receive an input image $x_t$ and generate one or more features or embeddings using the input layers 412. The features or embeddings from input layers 412 can be processed (e.g., convolved, etc.) using first distributed recurrent parameter(s) 415, and combined with information generated based on the previous hidden state (e.g., recurrent state) $h_{t-1}$. As illustrated, the information generated based on the previous state can be obtained based on processing the recurrent state $h_{t-1}$ that was output by the one or more hidden layers 414 at the previous time step t−1. For instance, the recurrent state $h_{t-1}$ can be provided as a recurrent input to the hidden layers 414 at time step t and convolved with one or more hidden state parameters 417. The output of the convolution based on the hidden state parameters 417 can be combined with the output of the convolution based on the input image $x_t$ and the first distributed recurrent parameter 415, to thereby generate a new or updated hidden state $h_t$ for the current time step t.

In a second time step 420, RNN 400 can obtain or receive a second input image $x_t$ and generate one or more features or embeddings using the same input layers as in first time step 410. The embeddings corresponding to the second input image $x_t$ can be convolved with second distributed recurrent parameter(s) 425 different from the first distributed recurrent parameter(s) 415. The convolutional output generated based on second input image $x_t$ and second distributed recurrent parameter(s) 425 can be combined (e.g., convolved) with information generated based on the hidden state $h_{t-1}$ of the previous time step, in a manner the same as described above with respect to first time step 410.

For example, at each time step, the convolutional output based on the input image $x_t$ and the corresponding distributed recurrent parameter (e.g., 415, 425, 435, or 445) can be different, based on the input image $x_t$ and the corresponding distributed recurrent parameter(s) being different for each of the four time steps 410, 420, 430, 440. As illustrated, each time step of the four time steps 410, 420, 430, 440 utilizes different distributed recurrent parameters. For example, the distributed recurrent parameters 415, 425, 435, 445 can each be different recurrent parameters that are included in a group T of parameters that are learned jointly during training of the RNN 400. At each time step t, the convolutional output generated from the input layer 412 embeddings of the input image $x_t$ can be generated using a selected one of the T parameters, $W_t$.

In some aspects, the selected or corresponding distributed recurrent parameter associated with each time step can be determined based on the frame index associated with the input image $x_t$ received for the given time step. For example, the distributed recurrent parameter to be utilized in a given time step can be determined as $W_t = W_{[t \% T]}$, where t % T represents the current frame index (e.g., current time step t) modulo T, the quantity of jointly learned recurrent parameters. In the example of FIG. 4, where the group of jointly learned recurrent parameters T includes the four different recurrent parameters 415, 425, 435, 445, the first recurrent parameter(s) 415 can be used to process the frames t, t+4, t+8, t+12, . . . ; the second recurrent parameter(s) 425 can be used to process the frames t+1, t+5, t+9, . . . ; the third recurrent parameter(s) 435 can be used to process the frames t+2, t+6, t+10, . . . ; and the fourth recurrent parameter(s) 445 can be used to process the frames t+3, t+7, t+11, . . . ; etc.

As noted above, a first convolutional output can be generated at each time step t based on the corresponding input image $x_t$ and the corresponding distributed recurrent parameter $W_t$ associated with the given time step t. A second convolutional output can be generated at each time step t based on the corresponding recurrent state $h_{t-1}$ that is provided as input to the hidden layers 414 at time step t. For instance, the recurrent state $h_{t-1}$ can be processed using one or more hidden layers 414 to generate hidden embeddings, features, representations, etc., which are subsequently convolved with a set of hidden parameters 417 (e.g., denoted in FIG. 4 as the parameters "U") to thereby generate the second convolutional output.

In some aspects, in each of the time steps 410, 420, 430, 440, the RNN 400 can use the same set of hidden parameters U 417 to generate the second convolutional output. The second convolutional output can vary between time steps based on a different recurrent state $h_{t-1}$ being provided as input to the hidden layers 414 at each given time step. For example, the recurrent state $h_{t-1}$ provided as input to the hidden layers 414 at second time step 420 can be the same as the hidden state $h_t$ generated as output in the first time step 410; the recurrent state $h_{t-1}$ provided as input to the hidden layers 414 at third time step 430 can be the same as the hidden state $h_t$ generated as output in the second time step 420; etc.

In one illustrative example, the hidden state output $h_t$ generated at second time step 420 can depend on the first distributed recurrent parameter(s) 415 (e.g., which are used in the first time step 410 to generate the hidden state output $h_t$ that is received as the recurrent state input $h_{t-1}$ in second time step 420) and the second distributed recurrent parameter(s) 425.

The hidden state output $h_t$ generated at third time step 430 can depend on the first distributed recurrent parameter(s) 415 and the second distributed recurrent parameter(s) 425

(e.g., inherited from the hidden state output $h_t$ of second time step 420, as described above, which is provided to the third time step 430 as the recurrent state input $h_{t-1}$) and can further depend on the third distributed parameter(s) 435.

The hidden state output $h_t$ generated at fourth time step 440 can depend on all four of the jointly learned, distributed recurrent parameters included in the group T. For instance, the recurrent state input $h_{t-1}$ to fourth time step 440 is the same as the hidden state output $h_t$ of third time step 430, which is generated based on the first three distributed recurrent parameters 415, 425, 435, (e.g., as described above). Subsequently, the hidden state output $h_t$ of fourth time step 440 is generated based on the fourth distributed recurrent parameter(s) 445 and the recurrent state input $h_{t-1}$ from third time step 430.

In some aspects, the distributed recurrent parameters 415, 425, 425, 445 may each include the same quantity of recurrent parameters. For example, the distributed recurrent parameters 415, 425, 435, 445 may each comprise one jointly learned recurrent parameter. In some examples, the distributed recurrent parameters 415, 425, 435, 445 may each include multiple recurrent parameters. For instance, the distributed recurrent parameters 415 may comprise a first subset of the group of jointly learned recurrent parameters, the distributed recurrent parameters 425 may comprise a second subset of the group of jointly learned recurrent parameters, etc. The subsets of the group of jointly learned recurrent parameters may be disjoint or may be partially overlapping. In some aspects, each subset of jointly learned recurrent parameters may include the same quantity of recurrent parameters. In other example, one or more (or all) of the subsets of jointly learned recurrent parameters may include a different quantity of recurrent parameters. In some aspects, RNN 400 can use the distributed recurrent parameters (e.g., 415, 425, 435, 445) to implement more complex functions (e.g., image and/or video processing operations) through time, rather than performing the same updates using the same recurrent parameters for each time step. In one illustrative example, RNN 400 can utilize the distributed recurrent parameters to generate processed output images using a compute budget that is the same as or similar to an RNN that utilizes a single fixed set of recurrent parameters for each time step. In some examples, the hidden parameters 417 can also vary for the different time steps 410, 420, 430, 440, in a manner the same as or similar to that described with respect to the choice or selection of distributed parameters 415, 425, 435, 445 from a larger group of jointly learned parameters T.

In some aspects, the systems and techniques described herein can be used to train a recurrent machine learning network (e.g., RNN, such as RNN 400) to process images (e.g., image data or video data) utilizing the distributed recurrent parameters described above based on initializing the recurrent machine learning network using different sets of parameters at each time step. For instance, the first recurrent parameter(s) 415 can be learned based on a first initialization or training data state provided to the recurrent machine learning network in association with the time steps t, t+4, t+8, t+12, . . . ; the second recurrent parameter(s) 425 can be learned based on a second initialization or training data state provided to the recurrent machine learning network in association with the time steps t+1, t+5, t+9, . . . ; the third recurrent parameter(s) 435 can be learned based on a third initialization or training data state provided to the recurrent machine learning network in association with the time steps t+2, t+6, t+10, . . . ; and the fourth recurrent parameter(s) 445 can be learned based on a fourth initialization or training data state provided to the recurrent machine learning network in association with the time steps t+3, t+7, t+11, . . . ; etc.

Figure 5:
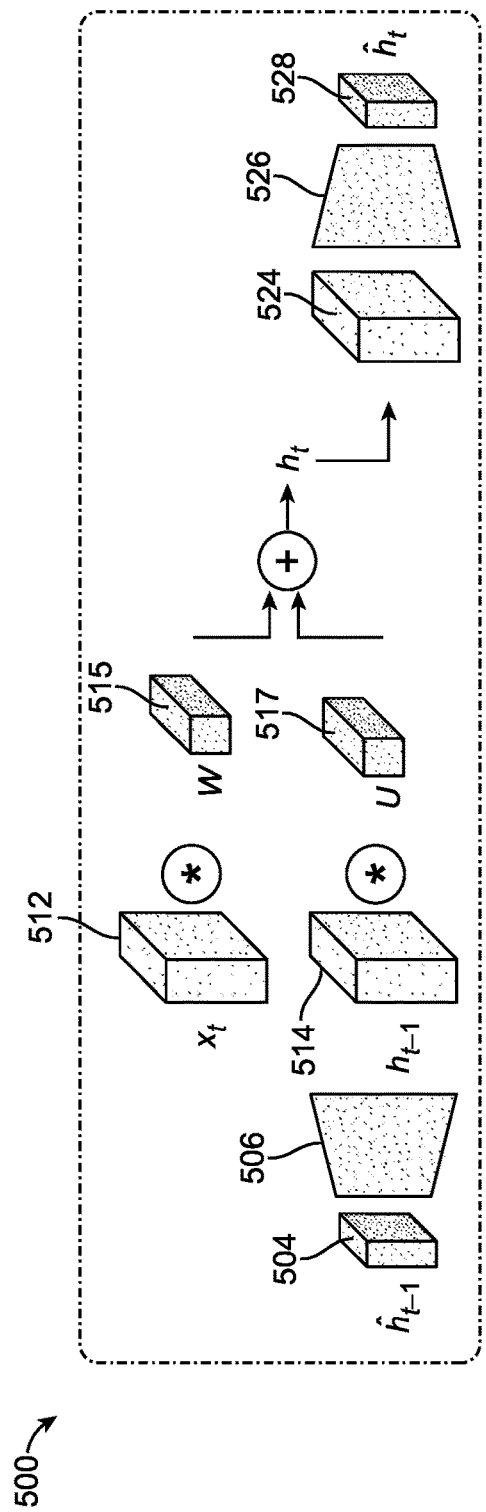
FIG. 5 illustrates an example of a recurrent neural network architecture using compression of recurrent states, in accordance with some examples.

FIG. 5 is a diagram illustrating an example of a recurrent neural network architecture 500 that utilizes compressed recurrent states $h_{t-1}$. In some examples, the recurrent neural network architecture 500 can be combined with or otherwise similar to the recurrent neural network architecture 400 described above with respect to FIG. 4.

FIG. 5 depicts an example operation of the RNN 500 over a single time step, in which a current image $x_t$ (e.g., current frame of video data) is received as input to one or more input layers 512. The input layers 512 may be the same as or similar to the input layers 412 illustrated in FIG. 4. Embeddings generated based on the input image $x_t$ and using the input layers 512 can be convolved with a set of recurrent parameters 515. In some examples, the same set of recurrent parameters 515 can be used by RNN 500 for each time step. In one illustrative example, different sets of recurrent parameters 515 can be used by RNN 500 for different time steps, in a manner the same as or similar to that described above with respect to the distributed recurrent parameters 515, 425, 435, 445 (e.g., the recurrent parameters 515 may be distributed recurrent parameters included in a larger group of jointly learned recurrent parameters T).

The RNN 500 can include one or more hidden layers 514, which generate embeddings based on a recurrent state $h_{t-1}$ that is also received as input for the current time step t (e.g., wherein the recurrent state $h_{t-1}$ is the hidden state output $h_t$ of the RNN 500 during the previous time step t−1. In one illustrative example, a compressed representation $\hat{h}_{t-1}$ of the recurrent state $h_{t-1}$ can be provided as input to the current time step t. The compressed representation $\hat{h}_{t-1}$ can be provided to one or more layers 504 and a decoder 506 to thereby recover the recurrent state information $h_{t-1}$ (e.g., at each time step t, RNN 500 can receive a compressed representation $\hat{h}_{t-1}$ and obtain the decompressed recurrent state $h_{t-1}$ using the layers 504 and decoder 506).

The hidden state output $h_t$ generated for the current time step t can be provided to an encoder 526, which can be trained to generate a compressed representation $\hat{h}_t$ of the current hidden state output $h_t$. In some aspects, the hidden state output $h_t$ can pass through one or more intermediate layers 524 provided prior to the encoder 526. In some examples, the output of encoder 526 can pass through one or more intermediate layers 528 that generate as output the compressed representation $\hat{h}_t$.

In one illustrative example, the encoder 526 and the decoder 506 can be jointly trained to perform compression and decompression, respectively, of hidden state information associated with the RNN 500. Based on the joint training of encoder 526 and decoder 506, the compressed representation $\hat{h}_t$ of the hidden state for current time step t can be the same as the compressed representation $\hat{h}_{t-1}$ of the recurrent state provided as input to the subsequent time step t+1. In one illustrative example, encoder 526 can generate the compressed representations $\hat{h}_t$ using one or more efficient convolutions to reduce the dimensions of an input state tensor (e.g., to reduce the dimensions of $h_t$).

Figure 6:
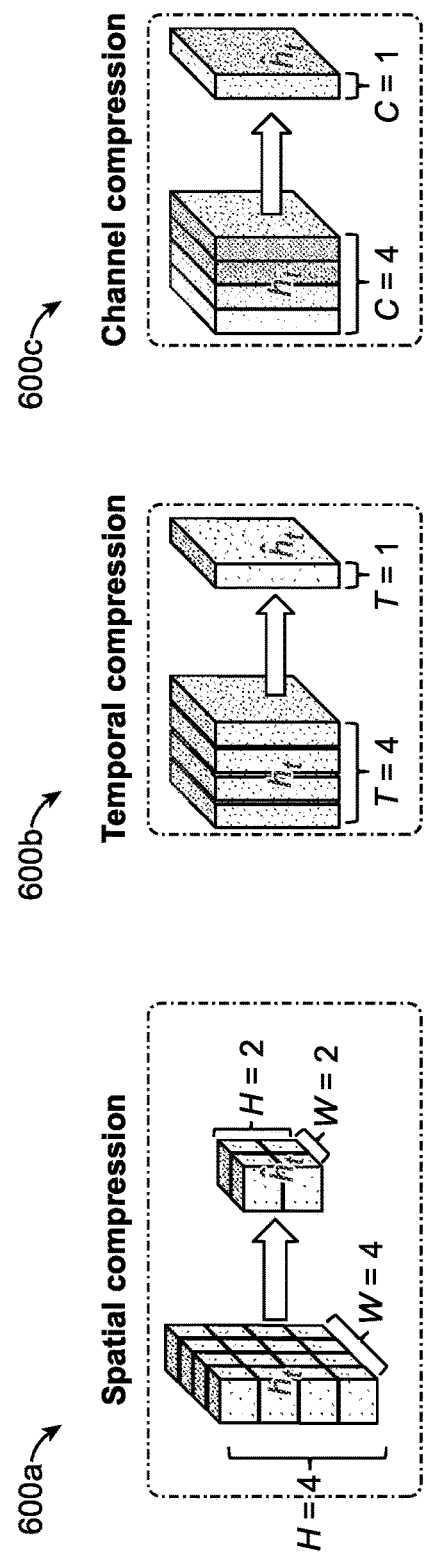
FIG. 6 illustrates examples of compression of recurrent states, in accordance with some examples.

FIG. 6 is a diagram illustrating examples of compression of recurrent states, in accordance with some examples. For instance, spatial compression 600a can be performed (e.g., by encoder 526) to reduce one or more spatial dimensions of the hidden state $h_t$. For example, the height and/or width (among other spatial dimensions) of the hidden state $h_t$ can be reduced in the corresponding compression representation $\hat{h}_t$. In the example of spatial compression 600a, an uncompressed hidden state $h_t$ may have a height and width spatial dimension of 4, and a compressed hidden state representation $\hat{h}_t$ may have reduced height and width spatial dimensions of 2.

In another example, temporal compression 600b can be performed (e.g., by encoder 526) to reduce one or more temporal dimensions of the hidden state $h_t$. For instance, the uncompressed hidden state $h_t$ may be associated with a temporal dimension of T=4 (e.g., the hidden state $h_t$ can correspond to or be associated with four different time steps), and encoder 526 can be used to generate a compressed hidden state representation $\hat{h}_t$ with a reduced temporal dimension of T=1.

In another example, channel compression 600c can be performed (e.g., by encoder 526) to reduce one or more channel dimensions or a channel quantity associated with the hidden state $h_t$. For instance, the uncompressed hidden state $h_t$ may be associated with a channel dimension or channel quantity of C=4, and encoder 526 can be used to generate a compressed hidden state representation $\hat{h}_t$ with a reduced channel dimension of C=1.

In some examples, encoder 526 can be used to perform multiple types of compression when generating a compressed hidden state representation $\hat{h}_t$. For instance, a compressed hidden state representation $\hat{h}_t$ can be generated using spatial compression 600a and temporal compression 600b; spatial compression 600a and channel compression 600c; etc. In some examples, encoder 526 can generate a compressed hidden state representation $\hat{h}_t$ using spatial compression 600a, temporal compression 600b, and channel compression 600c.

Figure 7A:
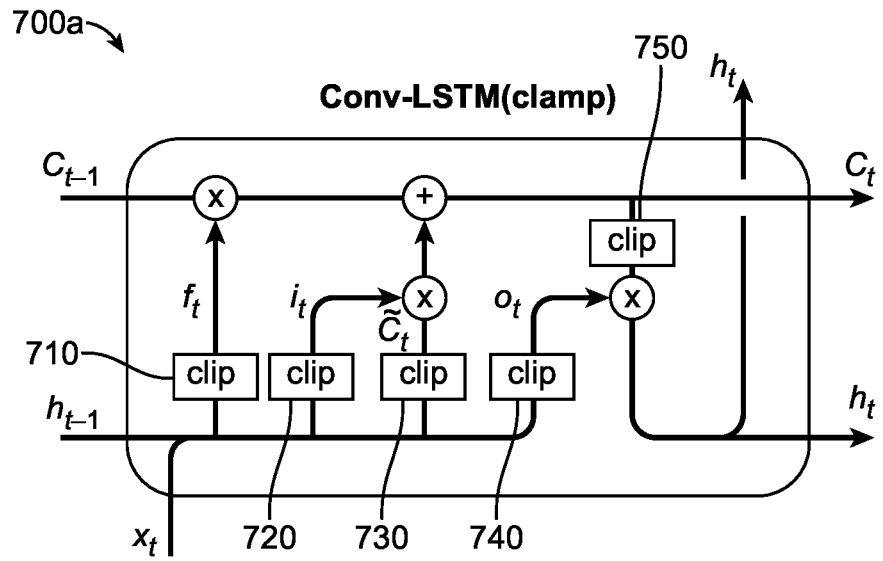
FIG. 7A is a diagram illustrating an example of clipping of an activation function associated with a recurrent neural network, in accordance with some examples.

FIG. 7A is a diagram illustrating an example of a recurrent cell 700a with activation function clipping, in accordance with some examples. For instance, recurrent cell 700a can be utilized to implement RNN 400 illustrated in FIG. 4 and/or to implement RNN 500 illustrated in FIG. 5. In one illustrative example, the recurrent cell 700a can be associated with or used to implement one or more clipped activation functions. For example, some recurrent cells may utilize tanh and/or sigmoid functions to generate the hidden state $h_t$ based on inputs including the current image $x_t$ and the recurrent state $h_{t-1}$ (e.g., as depicted in FIG. 7A). Tanh and sigmoid functions can incur a computational and/or time latency overhead based on running at a relatively high numerical precision. In some examples, the systems and techniques can implement recurrent cell 700a using a plurality of clipping functions (e.g., such as the clipping 710, 720, 730, 740, 750 illustrated in FIG. 7A). In one illustrative example, the clipping functions 710-750 may be used to replace some, or all, of the tanh and sigmoid functions of a recurrent cell. For instance, some (or all) of the tanh functions included in a recurrent cell can be replaced with clipping between [−1,1] and/or some (or all) of the sigmoid functions included in the recurrent cell can be replaced with clipping between [0,1]. In some aspects, the clipping functions 710, 720, and 740 depicted in FIG. 7A can perform clipping between [0,1] and the clipping functions 730 and 750 can perform clipping between [−1,1].

Figure 7B:
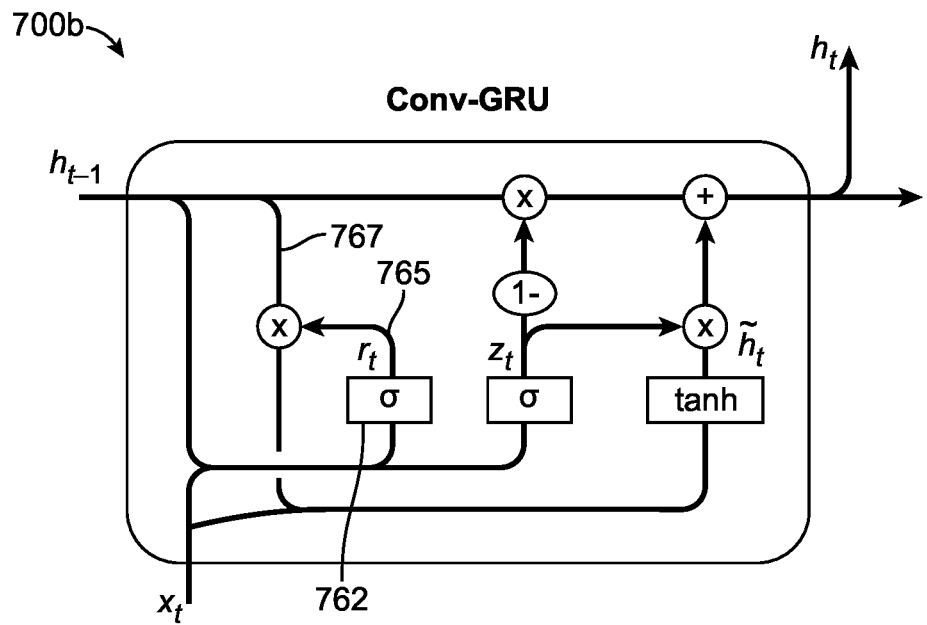
FIG. 7B is a diagram illustrating an example of a recurrent cell that may be associated with a recurrent neural network, in accordance with some examples.

FIG. 7B is a diagram illustrating an example of a recurrent cell 700b that may be associated with a recurrent neural network, in accordance with some examples. For instance, recurrent cell 700b can be utilized to implement RNN 400 illustrated in FIG. 4 and/or to implement RNN 500 illustrated in FIG. 5. In one illustrative example, the recurrent cell 700b can include a plurality of internal paths. For example, internal paths can carry the input image $x_t$ and the input recurrent state $h_{t-1}$ to intermediate processing functions and/or layers included in the recurrent cell 700b. As illustrated, a path can provide the input image $x_t$ to a tanh function included in the recurrent cell 700b, another path can provide the input image $x_t$ to one or more sigmoid functions included in the recurrent cell 700b, etc. In one illustrative example, the recurrent cell 700b can be simplified by removing the sigmoid function 762 and the paths 765 and 767. For example, based on removing the path 767, the tanh function of recurrent cell 700b receives as input the image x and does not receive the recurrent state $h_{t-1}$.

Figure 8:
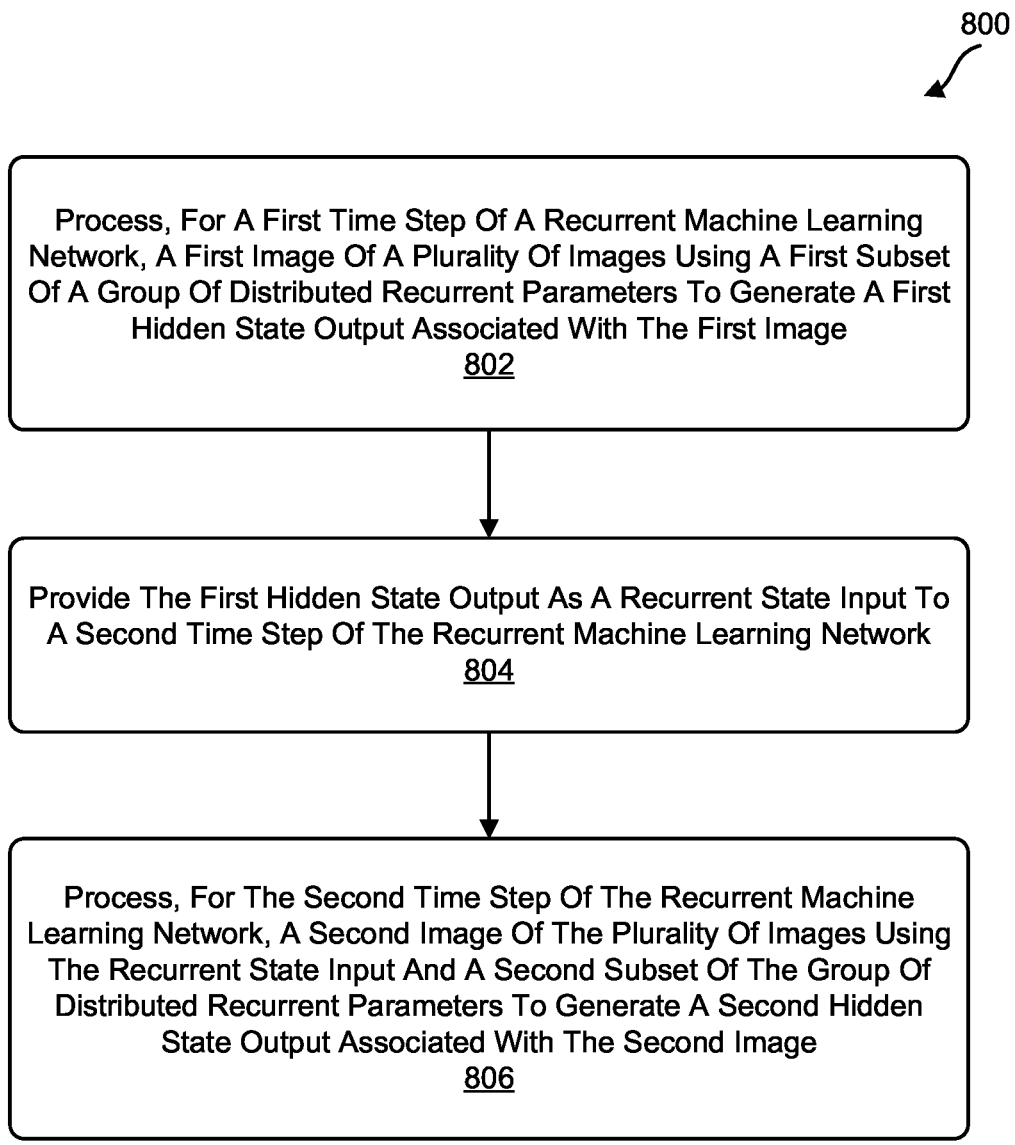
FIG. 8 is a flow diagram illustrating an example of a process for processing image and/or video data, in accordance with some examples.

FIG. 8 is a flowchart illustrating an example of a process 800 for processing image data. Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, the process 800 includes processing, for a first time step of a recurrent machine learning network, a first image of a plurality of images using a first subset of a group of distributed recurrent parameters to generate a first hidden state output associated with the first image. For example, the recurrent machine learning network can be the same as or similar to the recurrent machine learning network depicted in FIG. 3. In some cases, the recurrent machine learning network is a recurrent neural network (RNN). In some examples, one or more activation functions associated with the recurrent machine learning network comprise clipping functions, such as one or more of the clipping functions 710, 720, 730, 740, 750 of FIG. 7A. In some examples, the recurrent machine learning network can include one or more of the recurrent cell 700a of FIG. 7A and/or can include one or more of the recurrent cell 700b of FIG. 7.

In some examples, the first time step of the recurrent machine learning network can be one of the time steps 410, 420, 430, 440 depicted in FIG. 4. For example, the first time step of the recurrent machine learning network can be the time step 410 of FIG. 4; a second time step of the recurrent machine learning network can be the time step 420 of FIG. 4; etc. In some examples, each image of the plurality of images comprises a frame of video data. For instance. The first image (of the plurality of images) that is processed for the first time step of the recurrent machine learning network can be the input image $x_t$ provided to the first time step 410 of FIG. 4.

In some examples, the first subset of the group of distributed recurrent parameters can include one or more recurrent parameters that are different from one or more respective recurrent parameters included in the second subset. For example, the group of distributed recurrent parameters can be jointly trained recurrent parameters associated with training the recurrent machine learning network. In some examples, the group of distributed recurrent parameters can include one or more (or all) of the jointly trained recurrent parameters 415, 425, 435, 445 of FIG. 4. In one example, the first subset can include the jointly trained recurrent parameters 415 and the second subset can include the jointly trained recurrent parameters 425.

In some cases, the first hidden state output associated with the first image can be the hidden state output $h_t$ generated in the first time step 410 of FIG. 4 using the first subset of distributed recurrent parameters 415. In some examples, the first subset of the group of distributed recurrent parameters can be obtained based on selecting one or more first recurrent parameters from the group of distributed recurrent parameters, the one or more first recurrent parameters based on a frame index associated with the first image.

At block 804, the process 800 includes providing the first hidden state output as a recurrent state input to a second time step of the machine learning network. For example, the first hidden state output $h_t$ of first time step 410 of FIG. 4 can be provided as a recurrent state input $h_{t-1}$ to the second time step 420 of FIG. 4.

In some cases, to provide the first hidden state output as a recurrent state input to the second time step, the process 800 can include generating, using an encoder included in the recurrent machine learning network, a compressed representation of the first hidden state output. For example, the encoder can be the same as or similar to the encoder 526 of FIG. 5.

In some examples, the compressed representation of the first hidden state output can be generated based on performing one or more convolutions along a dimension of the first hidden state output, wherein the one or more convolutions compress the first hidden state output along the dimension. For instance, the one or more convolutions can be performed along at least one of a spatial dimension of the first hidden state output (e.g., by applying the spatial compression convolutions 600a of FIG. 6A); a temporal dimension of the first hidden state output (e.g., by applying the temporal compression convolutions 600b of FIG. 6), and/or a channel dimension of the first hidden state output (e.g., by applying the channel compression convolutions 600c of FIG. 6).

At block 806, the process 800 includes processing, for the second time step of the recurrent machine learning network, a second image of the plurality of images using the recurrent state input and a second subset of the group of distributed recurrent parameters to generate a second hidden state output associated with the second image. For instance, the second time step of the recurrent machine learning network can be the same as or similar to the second time step 420 of FIG. 4. The second image of the plurality of images can be the same as or similar to the second input image $x_t$ provided to the second time step 420 of FIG. 4. The first image and the second image can be obtained from the same plurality of images, which can be a plurality of frames of video data. In some examples, the second subset of the group of distributed recurrent parameters can be the same as or similar to the second subset of distributed recurrent parameters 425 of FIG. 4, which can be different than the first subset of distributed recurrent parameters 415 of FIG. 4.

The second hidden state output can be generated based on reconstructing the first hidden state output. When the first hidden state output is a compressed representation of the first hidden state output $h_t$ of first time step 410 of FIG. 4, the second hidden state output can be generated based on reconstructing the first hidden state output by processing the compressed representation of the first hidden state output using a corresponding decoder included in the recurrent machine learning network. For instance, the first hidden state output can be reconstructed using the corresponding decoder 506 of FIG. 5 (e.g., corresponding to the encoder 526 of FIG. 5 which can be used to generate the compressed representation of the first hidden state output, as described above with respect to block 704).

In some cases, the second hidden state output can be the hidden state output $h_t$ associated with the second time step 420 of FIG. 4. The second hidden state output can be generated based on using the reconstructed first hidden state output as the recurrent state input $h_{t-1}$ to the second time step 420 of FIG. 4. In some examples, the second subset of the group of distributed recurrent parameters (e.g., used to process the second image for the second time step of the recurrent machine learning network at block 806), can be obtained by selecting one or more second recurrent parameters from the group of distributed recurrent parameters. The one or more second recurrent parameters can be different than the one or more first recurrent parameters. The one or more second recurrent parameters can be selected based on a frame index associated with the second image, wherein the frame index associated with the second image is different than the frame index associated with the first image. In some examples, the second subset of the group of distributed recurrent parameters can include one or more recurrent parameters that are different from one or more respective recurrent parameters included in the first subset. For example, the group of distributed recurrent parameters can be jointly trained recurrent parameters associated with training the recurrent machine learning network. In some examples, the group of distributed recurrent parameters can include one or more (or all) of the jointly trained recurrent parameters 415, 425, 435, 445 of FIG. 4. In one example, the first subset can include the jointly trained recurrent parameters 415 and the second subset can include the jointly trained recurrent parameters 425.

In some examples, the processes described herein (e.g., process 800, and/or any other process described herein) may be performed by a computing device, apparatus, or system. In one example, the process 800 can be performed by a computing device or system having the computing device architecture 900 of FIG. 9. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
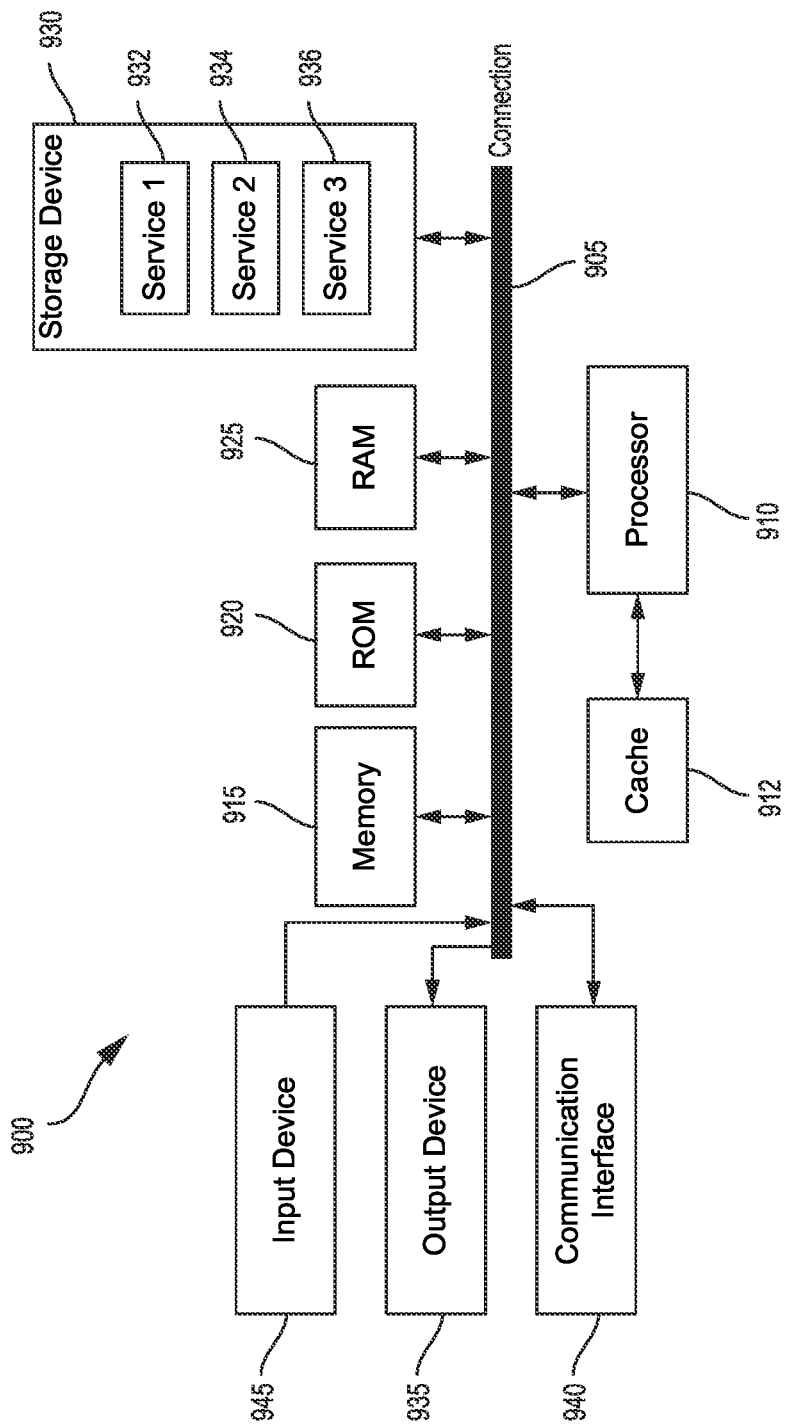
FIG. 9 is a block diagram illustrating an example of a computing system for implementing certain aspects described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random-access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other engines can control or be configured to control processor 910 to perform various actions. Other computing device memory 915 may be available for use as well. Memory 915 can include multiple different types of memory with different performance characteristics. Processor 910 can include any general-purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules or engines are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing at least a first image and a second image of a plurality of images, comprising: at least one memory configured to store at least the first image and the second image; and at least one processor coupled to the at least one memory, the at least one processor configured to: process, for a first time step of a recurrent machine learning network, a first image of the plurality of images using a first subset of a group of distributed recurrent parameters to generate a first hidden state output associated with the first image; provide the first hidden state output as a recurrent state input to a second time step of the recurrent machine learning network; and process, for the second time step of the recurrent machine learning network, a second image of the plurality of images using the recurrent state input and a second subset of the group of distributed recurrent parameters to generate a second hidden state output associated with the second image.

Aspect 2. The apparatus of Aspect 1, wherein the first subset includes one or more recurrent parameters that are different from one or more respective recurrent parameters included in the second subset.

Aspect 3. The apparatus of any of Aspects 1 to 2, wherein the group of distributed recurrent parameters are jointly trained recurrent parameters associated with training the recurrent machine learning network.

Aspect 4. The apparatus of Aspect 3, wherein the at least one processor is further configured to: obtain the first subset by selecting one or more first recurrent parameters from the group of distributed recurrent parameters, the one or more first recurrent parameters selected based on a frame index associated with the first image; and obtain the second subset by selecting one or more second recurrent parameters from the group of distributed recurrent parameters, the one or more second recurrent parameters different than the one or more first recurrent parameters, wherein the one or more second recurrent parameters are selected based on a frame index associated with the second image.

Aspect 5. The apparatus of any of Aspects 1 to 4, wherein, to provide the first hidden state output as a recurrent state input to the second time step, the at least one processor is further configured to: generate, using an encoder included in the recurrent machine learning network, a compressed representation of the first hidden state output.

Aspect 6. The apparatus of Aspect 5, wherein, to generate the second hidden state output, the at least one processor is further configured to: reconstruct the first hidden state output based on processing the compressed representation of the first hidden state output using a corresponding decoder included in the recurrent machine learning network; and generate the second hidden state output based on using the reconstructed first hidden state output as the recurrent state input.

Aspect 7. The apparatus of any of Aspects 5 to 6, wherein, to generate the compressed representation of the first hidden state output, the at least one processor is configured to: perform one or more convolutions along a dimension of the first hidden state output, wherein the one or more convolutions compress the first hidden state output along the dimension.

Aspect 8. The apparatus of Aspect 7, wherein the at least one processor is configured to perform the one or more convolutions along at least one of a spatial dimension of the first hidden state output, a temporal dimension of the first hidden state output, or a channel dimension of the first hidden state output.

Aspect 9. The apparatus of any of Aspects 1 to 8, wherein each image of the plurality of images comprises a frame of video data.

Aspect 10. The apparatus of any of Aspects 1 to 9, wherein the recurrent machine learning network is a recurrent neural network (RNN).

Aspect 11. The apparatus of any of Aspects 1 to 10, wherein one or more activation functions associated with the recurrent machine learning network comprise clipping functions.

Aspect 12. A method for processing at least a first image and a second image of a plurality of images, the method comprising: processing, for a first time step of a recurrent machine learning network, a first image of the plurality of images using a first subset of a group of distributed recurrent parameters to generate a first hidden state output associated with the first image; providing the first hidden state output as a recurrent state input to a second time step of the recurrent machine learning network; and processing, for the second time step of the recurrent machine learning network, a second image of the plurality of images using the recurrent state input and a second subset of the group of distributed recurrent parameters to generate a second hidden state output associated with the second image.

Aspect 13. The method of Aspect 12, wherein the first subset includes one or more recurrent parameters that are different from one or more respective recurrent parameters included in the second subset.

Aspect 14. The method of any of Aspects 12 to 13, wherein the group of distributed recurrent parameters are jointly trained recurrent parameters associated with training the recurrent machine learning network.

Aspect 15. The method of Aspect 14, further comprising: obtaining the first subset by selecting one or more first recurrent parameters from the group of distributed recurrent parameters, the one or more first recurrent parameters selected based on a frame index associated with the first image; and obtaining the second subset by selecting one or more second recurrent parameters from the group of distributed recurrent parameters, the one or more second recurrent parameters different than the one or more first recurrent parameters, wherein the one or more second recurrent parameters are selected based on a frame index associated with the second image.

Aspect 16. The method of any of Aspects 12 to 15, wherein providing the first hidden state output as a recurrent state input to the second time step comprises: generating, using an encoder included in the recurrent machine learning network, a compressed representation of the first hidden state output.

Aspect 17. The method of Aspect 16, wherein generating the second hidden state output comprises: reconstructing the first hidden state output based on processing the compressed representation of the first hidden state output using a corresponding decoder included in the recurrent machine learning network; and generating the second hidden state output based on using the reconstructed first hidden state output as the recurrent state input.

Aspect 18. The method of any of Aspects 16 to 17, wherein generating the compressed representation of the first hidden state output comprises: performing one or more convolutions along a dimension of the first hidden state output, wherein the one or more convolutions compress the first hidden state output along the dimension.

Aspect 19. The method of Aspect 18, further comprising performing the one or more convolutions along at least one of a spatial dimension of the first hidden state output, a temporal dimension of the first hidden state output, or a channel dimension of the first hidden state output.

Aspect 20. The method of any of Aspects 12 to 19, wherein each image of the plurality of images comprises a frame of video data.

Aspect 21. The method of any of Aspects 12 to 20, wherein the recurrent machine learning network is a recurrent neural network (RNN).

Aspect 22. The method of any of Aspects 12 to 21, wherein one or more activation functions associated with the recurrent machine learning network comprise clipping functions.

Aspect 23. A system for processing at least a first image and a second image of a plurality of images, comprising: at least one memory configured to store at least the first image and the second image; and at least one processor coupled to the at least one memory, the at least one processor configured to: process, for a first time step of a recurrent machine learning network, a first image of the plurality of images using a first subset of a group of distributed recurrent parameters to generate a first hidden state output associated with the first image; provide the first hidden state output as a recurrent state input to a second time step of the recurrent machine learning network; and process, for the second time step of the recurrent machine learning network, a second image of the plurality of images using the recurrent state input and a second subset of the group of distributed recurrent parameters to generate a second hidden state output associated with the second image.

Aspect 24. The system of Aspect 23, wherein the first subset includes one or more recurrent parameters that are different from one or more respective recurrent parameters included in the second subset.

Aspect 25. The system of any of Aspects 23 to 24, wherein the group of distributed recurrent parameters are jointly trained recurrent parameters associated with training the recurrent machine learning network.

Aspect 26. The system of Aspect 25, wherein the at least one processor is further configured to: obtain the first subset by selecting one or more first recurrent parameters from the group of distributed recurrent parameters, the one or more first recurrent parameters selected based on a frame index associated with the first image; and obtain the second subset by selecting one or more second recurrent parameters from the group of distributed recurrent parameters, the one or more second recurrent parameters different than the one or more first recurrent parameters, wherein the one or more second recurrent parameters are selected based on a frame index associated with the second image.

Aspect 27. The system of any of Aspects 23 to 26, wherein, to provide the first hidden state output as a recurrent state input to the second time step, the at least one processor is further configured to: generate, using an encoder included in the recurrent machine learning network, a compressed representation of the first hidden state output.

Aspect 28. The system of Aspect 27, wherein, to generate the second hidden state output, the at least one processor is further configured to: reconstruct the first hidden state output based on processing the compressed representation of the first hidden state output using a corresponding decoder included in the recurrent machine learning network; and generate the second hidden state output based on using the reconstructed first hidden state output as the recurrent state input.

Aspect 29. The system of any of Aspects 27 to 28, wherein, to generate the compressed representation of the first hidden state output, the at least one processor is configured to: perform one or more convolutions along a dimension of the first hidden state output, wherein the one or more convolutions compress the first hidden state output along the dimension.

Aspect 30. The system of Aspect 29, wherein the at least one processor is configured to perform the one or more convolutions along at least one of a spatial dimension of the first hidden state output, a temporal dimension of the first hidden state output, or a channel dimension of the first hidden state output.

Aspect 31. The system of any of Aspects 23 to 30, wherein each image of the plurality of images comprises a frame of video data.

Aspect 32. The system of any of Aspects 23 to 31, wherein the recurrent machine learning network is a recurrent neural network (RNN).

Aspect 33. The system of any of Aspects 23 to 32, wherein one or more activation functions associated with the recurrent machine learning network comprise clipping functions.

Aspect 34. A non-transitory computer-readable medium including instructions that, when executed by at least one processor, cause the at least one processor to perform operations according to any of Aspects 1 to 11.

Aspect 35. A non-transitory computer-readable medium including instructions that, when executed by at least one processor, cause the at least one processor to perform operations according to any of Aspects 12 to 22.

Aspect 36. A non-transitory computer-readable medium including instructions that, when executed by at least one processor, cause the at least one processor to perform operations according to any of Aspects 23 to 30.

Aspect 37. An apparatus for processing image data, the apparatus comprising one or more means for performing operations according to any of Aspects 1 to 11.

Aspect 38. An apparatus for processing image data, the apparatus comprising one or more means for performing operations according to any of Aspects 12 to 22.

Aspect 39. An apparatus for processing image data, the apparatus comprising one or more means for performing operations according to any of Aspects 23 to 30.

What is claimed is:

1. An apparatus for processing at least a first image and a second image of a plurality of images, comprising:
at least one memory configured to store at least the first image and the second image; and
at least one processor coupled to the at least one memory, the at least one processor configured to:
process, for a first inference time step of a recurrent machine learning network including a set of recurrent machine learning layers, a first image of the plurality of images using a first subset of distributed recurrent parameters determined from a plurality of jointly trained recurrent parameters associated with the recurrent machine learning network, wherein the set of recurrent machine learning layers is parameterized by the first subset of distributed recurrent parameters and used to generate a first hidden state output corresponding to the first image;
provide the first hidden state output as a recurrent state input to a second inference time step of the recurrent machine learning network, wherein the second inference time step uses the same set of recurrent machine learning layers as the first inference time step, and wherein for the second inference time step the set of recurrent machine learning layers is parameterized by a second subset of distributed recurrent parameters different from the first subset, the second subset of distributed recurrent parameters included in the plurality of jointly trained recurrent parameters; and
process, for the second inference time step of the recurrent machine learning network, a second image of the plurality of images using the recurrent state input and the second subset of distributed recurrent parameters to generate a second hidden state output corresponding to the second image, wherein the second hidden state output is generated using the set of recurrent machine learning layers parameterized by the second subset of distributed recurrent parameters.

2. The apparatus of claim 1, wherein the first subset includes one or more recurrent parameters that are different from one or more respective recurrent parameters included in the second subset.

3. The apparatus of claim 1, wherein the first and second subsets of distributed recurrent parameters are selected from the plurality of jointly trained recurrent parameters associated with training the recurrent machine learning network.

4. The apparatus of claim 3, wherein the at least one processor is further configured to:
obtain the first subset by selecting one or more first recurrent parameters from the plurality of jointly trained recurrent parameters based on a first frame index associated with the first image; and
obtain the second subset by selecting one or more second recurrent parameters from the plurality of jointly trained recurrent parameters, the one or more second recurrent parameters different than the one or more first recurrent parameters, and wherein the one or more second recurrent parameters are selected based on a second frame index associated with the second image.

5. The apparatus of claim 1, wherein, to provide the first hidden state output as the recurrent state input to the second inference time step, the at least one processor is further configured to:
generate, using an encoder included in the recurrent machine learning network, a compressed representation of the first hidden state output.

6. The apparatus of claim 5, wherein, to generate the second hidden state output, the at least one processor is further configured to:
reconstruct the first hidden state output based on processing the compressed representation of the first hidden state output using a corresponding decoder included in the recurrent machine learning network; and
generate the second hidden state output based on using the reconstructed first hidden state output as the recurrent state input.

7. The apparatus of claim 5, wherein, to generate the compressed representation of the first hidden state output, the at least one processor is configured to:
perform one or more convolutions along a dimension of the first hidden state output, wherein the one or more convolutions compress the first hidden state output along the dimension.

8. The apparatus of claim 7, wherein the at least one processor is configured to perform the one or more convolutions along at least one of a spatial dimension of the first hidden state output, a temporal dimension of the first hidden state output, or a channel dimension of the first hidden state output.

9. The apparatus of claim 1, wherein each image of the plurality of images comprises a frame of video data.

10. The apparatus of claim 1, wherein the recurrent machine learning network is a recurrent neural network (RNN).

11. The apparatus of claim 1, wherein one or more activation functions associated with the recurrent machine learning network comprise clipping functions.

12. A method for processing at least a first image and a second image of a plurality of images, the method comprising:
processing, for a first inference time step of a recurrent machine learning network including a set of recurrent machine learning layers, a first image of the plurality of images using a first subset of distributed recurrent parameters determined from a plurality of jointly trained recurrent parameters associated with the recurrent machine learning network, wherein the set of recurrent machine learning layers is parameterized by the first subset of distributed recurrent parameters and used to generate a first hidden state output corresponding to the first image;
providing the first hidden state output as a recurrent state input to a second inference time step of the recurrent machine learning network, wherein the second inference time step uses the same set of recurrent machine learning layers as the first inference time step, and wherein for the second inference time step the set of recurrent machine learning layers is parameterized by a second subset of distributed recurrent parameters different from the first subset, the second subset of distributed recurrent parameters included in the plurality of jointly trained recurrent parameters; and
processing, for the second inference time step of the recurrent machine learning network, a second image of the plurality of images using the recurrent state input and the second subset of distributed recurrent parameters to generate a second hidden state output corresponding to the second image, wherein the second hidden state output is generated using the set of recurrent machine learning layers parameterized by the second subset of distributed recurrent parameters.

13. The method of claim 12, wherein the first subset includes one or more recurrent parameters that are different from one or more respective recurrent parameters included in the second subset.

14. The method of claim 12, wherein the group first and second subsets of distributed recurrent parameters are selected from the plurality of jointly trained recurrent parameters associated with training the recurrent machine learning network.

15. The method of claim 14, further comprising:
obtaining the first subset by selecting one or more first recurrent parameters from the plurality of jointly trained recurrent parameters based on a first frame index associated with the first image; and
obtaining the second subset by selecting one or more second recurrent parameters from the plurality of jointly trained recurrent parameters, the one or more second recurrent parameters different than the one or more first recurrent parameters, and wherein the one or more second recurrent parameters are selected based on a second frame index associated with the second image.

16. The method of claim 12, wherein providing the first hidden state output as the recurrent state input to the second inference time step comprises:
generating, using an encoder included in the recurrent machine learning network, a compressed representation of the first hidden state output.

17. The method of claim 16, wherein generating the second hidden state output comprises:
reconstructing the first hidden state output based on processing the compressed representation of the first hidden state output using a corresponding decoder included in the recurrent machine learning network; and
generating the second hidden state output based on using the reconstructed first hidden state output as the recurrent state input.

18. The method of claim 16, wherein generating the compressed representation of the first hidden state output comprises:
performing one or more convolutions along a dimension of the first hidden state output, wherein the one or more convolutions compress the first hidden state output along the dimension.

19. The method of claim 18, further comprising performing the one or more convolutions along at least one of a spatial dimension of the first hidden state output, a temporal dimension of the first hidden state output, or a channel dimension of the first hidden state output.

20. The method of claim 12, wherein each image of the plurality of images comprises a frame of video data.

21. The method of claim 12, wherein the recurrent machine learning network is a recurrent neural network (RNN).

22. The method of claim 12, wherein one or more activation functions associated with the recurrent machine learning network comprise clipping functions.

23. A non-transitory computer-readable medium including instructions that, when executed by at least one processor, cause the at least one processor to:
process, for a first inference time step of a recurrent machine learning network including a set of recurrent machine learning layers, a first image of a plurality of images using a first subset of distributed recurrent parameters determined from a plurality of jointly trained recurrent parameters associated with the recurrent machine learning network, wherein the set of recurrent machine learning layers is parameterized by the first subset of distributed recurrent parameters and used to generate a first hidden state output corresponding to the first image;
provide the first hidden state output as a recurrent state input to a second inference time step of the recurrent machine learning network, wherein the second inference time step uses the same set of recurrent machine learning layers as the first inference time step, and wherein for the second inference time step the set of recurrent machine learning layers is parameterized by a second subset of distributed recurrent parameters different from the first subset, the second subset of distributed recurrent parameters included in the plurality of jointly trained recurrent parameters; and
process, for the second inference time step of the recurrent machine learning network, a second image of the plurality of images using the recurrent state input and the second subset of distributed recurrent parameters to generate a second hidden state output corresponding to the second image, wherein the second hidden state output is generated using the set of recurrent machine learning layers parameterized by the second subset of distributed recurrent parameters.

24. The non-transitory computer-readable medium of claim 23, wherein the first subset includes one or more recurrent parameters that are different from one or more respective recurrent parameters included in the second subset.

25. The non-transitory computer-readable medium of claim 23, wherein the first and second subsets of distributed recurrent parameters are selected from the plurality of jointly trained recurrent parameters associated with training the recurrent machine learning network.

26. The non-transitory computer-readable medium of claim 25, wherein the instructions further cause the at least one processor to:
obtain the first subset by selecting one or more first recurrent parameters from the plurality of jointly trained recurrent parameters based on a first frame index associated with the first image; and
obtain the second subset by selecting one or more second recurrent parameters from the plurality of jointly trained recurrent parameters, the one or more second recurrent parameters different than the one or more first recurrent parameters, and wherein the one or more second recurrent parameters are selected based on a second frame index associated with the second image.

27. The non-transitory computer-readable medium of claim 23, wherein, to provide the first hidden state output as the recurrent state input to the second inference time step, the instructions cause the at least one processor to:
generate, using an encoder included in the recurrent machine learning network, a compressed representation of the first hidden state output.

28. The non-transitory computer-readable medium of claim 27, wherein, to generate the second hidden state output, the instructions cause the at least one processor to:
reconstruct the first hidden state output based on processing the compressed representation of the first hidden state output using a corresponding decoder included in the recurrent machine learning network; and
generate the second hidden state output based on using the reconstructed first hidden state output as the recurrent state input.

29. The non-transitory computer-readable medium of claim 27, wherein, to generate the compressed representation of the first hidden state output, the instructions cause the at least one processor to:
perform one or more convolutions along a dimension of the first hidden state output, wherein the one or more convolutions compress the first hidden state output along the dimension.

30. The non-transitory computer-readable medium of claim 29, wherein the instructions cause the at least one processor to perform the one or more convolutions along at least one of a spatial dimension of the first hidden state output, a temporal dimension of the first hidden state output, or a channel dimension of the first hidden state output.

* * * * *